United States Patent
Liu et al.

(10) Patent No.: US 9,295,051 B2
(45) Date of Patent: Mar. 22, 2016

(54) SYSTEMS AND METHODS FOR BUNDLING RESOURCE BLOCKS IN A WIRELESS COMMUNICATION NETWORK

(71) Applicant: Samsung Electronics Co., Ltd., Suwon-si, Gyeonggi-do (KR)

(72) Inventors: Lingjia Liu, Allen, TX (US); Young-Han Nam, Plano, TX (US); Jianzhong Zhang, Plano, TX (US)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 0 days.

(21) Appl. No.: 14/555,267

(22) Filed: Nov. 26, 2014

(65) Prior Publication Data

US 2015/0146681 A1 May 28, 2015

Related U.S. Application Data

(63) Continuation of application No. 13/083,193, filed on Apr. 8, 2011, now Pat. No. 8,917,677.

(60) Provisional application No. 61/324,242, filed on Apr. 14, 2010.

(51) Int. Cl.
*H04W 72/04* (2009.01)
*H04L 5/00* (2006.01)
(Continued)

(52) U.S. Cl.
CPC .............. *H04W 72/042* (2013.01); *H04L 5/005* (2013.01); *H04L 5/0007* (2013.01); *H04L 5/0023* (2013.01); *H04L 5/0035* (2013.01); *H04L 5/0037* (2013.01); *H04L 5/0044* (2013.01); *H04L 5/0051* (2013.01); *H04L 25/0204* (2013.01); *H04L 25/03343* (2013.01); *H04L 27/2613* (2013.01); *H04L 25/03891* (2013.01); *H04W 72/044* (2013.01); *H04W 72/048* (2013.01)

(58) Field of Classification Search
None
See application file for complete search history.

(56) References Cited

U.S. PATENT DOCUMENTS

| 8,194,770 B2 | 6/2012 | Medvedev et al. |
| 2007/0217540 A1 * | 9/2007 | Onggosanusi et al. ....... 375/267 |

(Continued)

FOREIGN PATENT DOCUMENTS

| KR | 10-0904433 | 6/2009 |
| KR | 10-0921467 | 10/2009 |

(Continued)

OTHER PUBLICATIONS

"3GPP TS 36.213 version 9.1.0 Release 9", Mar. 30, 2010, p. 23-24.*

(Continued)

*Primary Examiner* — Gregory Sefcheck
*Assistant Examiner* — Jenkey Van

(57) ABSTRACT

A base station for use in a wireless network is operable to communicate with a plurality of mobile stations. The base station transmits a downlink frame to a first mobile station. The downlink frame comprises time-frequency resource elements allocated in a plurality of physical resource blocks. The base station transmits the plurality of physical resource blocks in bundles having a bundle size that is a function of the system bandwidth configuration and the base station uses the same precoder for all physical resource blocks in the same bundle. The bundle size is from one physical resource block to three physical resource blocks.

20 Claims, 10 Drawing Sheets

TABLE 1

| System Bandwidth $N_{RB}^{DL}$ | Precoding SubsetSize (M) |
|---|---|
| ≤10 | 1 |
| 11 – 63 | 2 |
| 64 – 110 | 3 |

TABLE 2

| System Bandwidth $N_{RB}^{DL}$ | Precoding SubsetSize (M) |
|---|---|
| ≤10 | 1 |
| 11 – 110 | 2 |

(51) Int. Cl.
*H04L 25/02* (2006.01)
*H04L 25/03* (2006.01)
*H04L 27/26* (2006.01)

(56) References Cited

U.S. PATENT DOCUMENTS

| | | | |
|---|---|---|---|
| 2009/0175230 A1* | 7/2009 | Callard et al. | 370/329 |
| 2009/0323613 A1 | 12/2009 | Frederiksen et al. | |
| 2011/0110444 A1* | 5/2011 | Roh et al. | 375/260 |
| 2011/0170501 A1 | 7/2011 | Seo et al. | |
| 2011/0274076 A1* | 11/2011 | Classon et al. | 370/329 |
| 2012/0099544 A1* | 4/2012 | Pajukoski et al. | 370/329 |
| 2012/0140726 A1* | 6/2012 | Moon et al. | 370/329 |
| 2013/0114419 A1* | 5/2013 | Chen et al. | 370/248 |
| 2013/0194931 A1* | 8/2013 | Lee et al. | 370/241 |
| 2013/0242886 A1* | 9/2013 | Chen et al. | 370/329 |
| 2013/0242947 A1* | 9/2013 | Chen et al. | 370/335 |
| 2014/0348012 A1* | 11/2014 | Wu | 370/252 |

FOREIGN PATENT DOCUMENTS

| | | |
|---|---|---|
| RU | 2166774 C2 | 5/2001 |
| WO | WO 2004/021634 A1 | 3/2004 |

OTHER PUBLICATIONS

International Search Report dated Dec. 7, 2011 in connection with International Patent Application No. PCT/KR2011/002664.
Office Action dated Nov. 7, 2013 in connection with U.S. Appl. No. 13/115,900.
Notice of Allowance dated Jan. 2, 2014 in connection with U.S. Appl. No. 13/159,091.
Extended European Search Report dated Jul. 10, 2014 in connection with European Patent Application Serial No. 14171578.9; 7 pages.
3GPP TSG RAN WG1 Meeting #60bis; "Consideration on Downlink DM-RS PRB-bundling"; R1-102376; Beijing, China; Apr. 12-16, 2010; 5 pages.
Translated Chinese Office Action dated Nov. 5, 2014 in connection with Chinese Patent Application Serial No. 201180019079.7; 23 pages.
3GPP TSG RAN WG1 Meeting #59bis; "Discussion on RB Bundling for DM-RS"; R1-100104; Valencia, Spain; Jan. 18-22, 2010; 4 pages.
3GPP TSG RAN WG1 Meeting #59bis; "Discussion on RB Bundling for DM-RS"; R1-101153; San Francisco, USA; Feb. 22-26, 2010; 5 pages.
3GPP TSG RAN WG1 Meeting #60bis; "Discussion on RB Bundling for DM-RS"; R1-102187; Beijing, China; Apr. 12-16, 2010; 5 pages.
3GPP TSG RAN WG1 Meeting #56bis; "Correction relative to maximum RB size"; R1-091183; Seoul, Korea; Mar. 23-27, 2009; 2 pages.
3GPP 3GPP, TSGRAN, E-UTRA, "Physical layer procedures" Release 9; 36.213 V9.1.0; Mar. 31, 2010; pp. 21-26.
Decision on Grant dated Mar. 27, 2015 in connection with Russian Patent Application No. 2012143721; 18 pages.
Notice of Acceptance dated Oct. 27, 2015 in connection with Australian Patent Application No. 2011241291; 2 pages.
Japanese Office Action dated Sep. 14, 2015 in connection with Japanese Patent Application No. 2014-210681; 5 pages.
3GPP TSG RAN WG1 Meeting #61; "PRB bundling for Rel-10"; R1-103016; Montreal, Canada; May 10-14, 2010; 6 pages.
3GPP TSG RAN WG1 #58bis; "Discussion on DM-RS for LTE-Advanced"; R1-094088; Miyazaki, Japan; Oct. 12-16, 2009; 4 pages.
US 8,547,915, 10/2013, Seo et al. (withdrawn)

* cited by examiner

| System Bandwidth $N_{RB}^{DL}$ | Precoding SubsetSize ($M$) |
|---|---|
| ≤10 | 1 |
| 11 – 63 | 2 |
| 64 – 110 | 3 |

TABLE 1

FIGURE 8A

| System Bandwidth $N_{RB}^{DL}$ | Precoding SubsetSize ($M$) |
|---|---|
| ≤10 | 1 |
| 11 – 110 | 2 |

TABLE 2

FIGURE 8B

| System Bandwidth $N_{RB}^{DL}$ | RBG Size ($P$) | Precoding SubsetSize ($M$) |
|---|---|---|
| ≤10 | 1 | 1 |
| 11 – 26 | 2 | 2 |
| 27 – 63 | 3 | 3 |
| 64 – 110 | 4 | 2 |

TABLE 3

FIGURE 8C

SYSTEMS AND METHODS FOR BUNDLING RESOURCE BLOCKS IN A WIRELESS COMMUNICATION NETWORK

CROSS-REFERENCE TO RELATED APPLICATION(S) AND CLAIM OF PRIORITY

This application a continuation of U.S. Non-Provisional patent application Ser. No. 13/083,193 filed Apr. 8, 2011 and entitled "SYSTEMS AND METHODS FOR BUNDLING RESOURCE BLOCKS IN A WIRELESS COMMUNICATION SYSTEM," and claims priority to U.S. Provisional Patent Application No. 61/324,242, filed Apr. 14, 2010, entitled "RESOURCE BLOCK BUNDLING SIZE FOR LTE-A SYSTEMS." The content of the above-identified patent documents is hereby incorporated by reference.

TECHNICAL FIELD

The present application relates generally to wireless communications and, more specifically, to a method and system for enabling resource block bundling.

BACKGROUND

In $3^{rd}$ Generation Partnership Project Long Term Evolution (3GPP LTE), Orthogonal Frequency Division Multiplexing (OFDM) is adopted as a downlink (DL) transmission scheme.

GPP LTE (Long Term Evolution) standard is the last stage in the realization of true 4th generation (4G) mobile telephone networks. Most major mobile carriers in the United States and several worldwide carriers have announced plans to convert their networks to LTE beginning in 2009. LTE is a set of enhancements to the Universal Mobile Telecommunications System (UMTS). Much of 3GPP Release 8 focuses on adopting 4G mobile communications technology, including an all-IP flat networking architecture.

The 3GPP LTE standard uses orthogonal frequency division multiplexing (OFDM) for the downlink (i.e., from the base station to the mobile station). Orthogonal frequency division multiplexing (OFDM) is a multi-carrier transmission technique that transmits on many orthogonal frequencies (or subcarriers). The orthogonal subcarriers are individually modulated and separated in frequency such that they do not interfere with one another. This provides high spectral efficiency and resistance to multipath effects.

In Release 8 LTE systems, a user equipment (UE) or mobile station (MS) is required to perform channel estimation based on common reference signals (CRSs) over the entire bandwidth. Once channel estimation is performed, the mobile station (or UE) performs demodulation based on different transmission modes indicated by the different formats of the downlink control information. For example, when downlink spatial multiplexing is performed, downlink control information (DCI) format 2 is used and the mobile station performs demodulation based on the resource assignment and TPMI (transmission PMI) contained in the DCI format.

In 3GPP Technical Specification No. 36.212, version 8.8.0, "E-UTRA, Multiplexing and Channel Coding" (December 2009), the definition of TPMI is defined in Table 5.3.3.1.5-4 (2 antenna ports) and in Table 5.3.3.1.5-5 (4 antenna ports) of Section 5.3.3.1.5. The 3GPP Technical Specification No. 36.212, version 8.8.0, is hereby incorporated by reference into the present disclosure as if fully set forth herein.

The base station (or eNodeB) indicates to the mobile station (MS) or user equipment (UE) whether the base station (BS) is implementing wideband precoding or subband precoding based on mobile station feedback and the mobile station performs downlink demodulation accordingly.

In LTE-Advanced (LTE-A) systems, the downlink demodulation is based on dedicated reference signals (DRS), which are UE-specific reference signals (UE-RS).

In LTE-Advanced systems, demodulation of the data channel is based on the precoded UE-specific reference signal. That is, the reference signals are precoded using the same precoder as the data channel as described in 3GPP Document No. R1-090529, "Way Forward On CoMP And MIMO DL RS," Outcome of Ad Hoc Discussions (January 2009), and 3GPP Document No. R1-091066, "Way Forward On Downlink Reference Signals For LTE-A," (March 2009), both of which are hereby incorporated by reference into the present disclosure as if fully set forth herein.

Reference signals (RSs) targeting PDSCH demodulation (for LTE-A operation) are also UE-specific and are transmitted only in scheduled resource blocks (RBs) and the corresponding layers. Different layers can target the same or different UEs. The design principle is an extension of the concept of Rel-8 UE-specific RS (used for beamforming) to multiple layers. Reference signals on different layers are mutually orthogonal. Reference signals and data are subject to the same precoding operation, and complementary use of Rel-8 CRS by the UE is not precluded.

In Document No. R1-094413, "Way Forward On The Details Of DCI Format 2B For Enhanced DL Transmission," 3GPP RAN1#58bis, Miyazaki (October 2009), which is hereby incorporated by reference into the present disclosure as if fully set forth herein, an agreement has been made for DCI format 2B. In the agreement, the DCI Format 2B is based on DCI Format 2A. One (1) bit is added for the source channel identifier (SC-ID) and the Swap Flag is removed. For rank 1 transmission, the new data indicator (NDI) bit of the disabled transport block is re-used to indicate port information. A value of 0 is used to indicate an enabled transport block (TB) associated with port 7. A value of 1 is used to indicate an enabled transport block associated with port 8. For rank 2 transmission, TB1 is associated with port 7, and TB2 associated with port 8. DCI format 2C can be constructed based on DCI format 2B for Release 10 transmission modes for facilitating dynamic SU- and MU-MIMO switching.

Since an eNodeB could potentially perform resource block (RB)-based precoding, the baseline granularity for channel estimation and demodulation is one resource block (RB). However, as disclosed in 3GPP Document No. R1-093105, "UE-RS Patterns for LTE-A", Qualcomm Europe (August 2009), which is hereby incorporated by reference into the present disclosure as if fully set forth herein, "resource block (RB) bundling" (i.e., bundling contiguous RBs together to perform channel estimation and demodulation) will help higher rank (i.e., rank 5 to 8) transmissions achieve adequate channel estimation accuracy along with low overhead. It is also noted that RB bundling could be used to balance the transmission power imbalance across OFDM symbols for some high rank DM-RS patterns, as disclosed in 3GPP Document No. R1-094575, "Discussion On DM-RS For LTE-Advanced", Samsung (November 2009); 3GPP Document No. R1-094438, "On Rel-10 DM RS Design For Rank 5-8", Ericsson, ST-Ericsson (November 2009), and 3GPP Document No. R1-094548, "Further Investigation On DMRS Design For LTE-A", CATT (November 2009), which are hereby incorporated by reference into the present disclosure as if fully set forth herein.

FIGS. 3A-3C illustrate dedicated reference signal (DRS) patterns that support two and four layer transmissions according to an embodiment of this disclosure. Dedicated reference signal (DRS) patterns 301 and 303 illustrate pilot patterns that can support up to two (2) layer transmissions. DRS resource elements labeled with (0,1) in DRS pattern 301 carry dedicated reference signals for layer 0 and 1 with the reference signals of the two layers code-division multiplexed (CDMed). Similarly, for DRS resource elements labeled with (2,3) in DRS pattern 303 carry dedicated reference signals for layer 2 and 3 with the reference signals of the two layers code-division multiplexed (CDMed).

In the two adjacent DRS resource elements labeled with (0,1), DRS symbols [r0 r1] for layer 0 are mapped to the two resource elements spread by a Walsh code [1 1], which results in [r0 r1], while DRS symbols r2 and r3 for layer 1 are mapped to the two resource elements spread by a Walsh code [1 −1], which results in [r2 −r3].

DRS pattern 305 illustrates a pilot pattern that can support up to four layer transmissions, where the DRS resource elements are again partitioned into two groups, those labeled with (0,1) and those with (2,3). In this pattern, the DRS resource elements labeled with (0,1) carry dedicated reference signals for layer 0 and 1 with the reference signals of the two layers code-division multiplexed (CDMed). The DRS resource elements labeled with (2,3) carry dedicated reference signals for layer 2 and 3 with the reference signals of the two layers code-division multiplexed (CDMed).

FIG. 4 illustrates DRS patterns 401 and 403, which support eight layer transmissions according to an embodiment of the disclosure. In FIG. 4, resource elements labeled with alphabet character X, where X is one of G, H, I, J, L, K, are used for carrying a number of dedicated reference signals among the 8 dedicated reference signals, where the number of dedicated reference signals are CDMed. DRS pattern 401 is based on spreading factor 2 CDM across two time-adjacent resource elements with the same alphabet character label. DRS pattern 403 is based on spreading factor 4 CDM across two groups of two time-adjacent resource elements with the same alphabet character label. In this embodiment, the 8 antenna ports in a Rank-8 pattern are referred to as antenna ports 4, 5, 6, 7, 8, 9, 10 and 11 in the sequel to distinguish them from the antenna ports in Rank-2 and Rank-4 patterns.

It is noted that in Rel-8 LTE, antenna ports 0, 1, 2, 3, 4 and 5 are used for CRS, MBSFN RS and Rel-8 DRS. Hence, if the numbering convention extending Rel-8 LTE is followed, the new antenna port numbers will start from 6. Rank-2 pattern will have antenna ports (6, 7). Rank-4 pattern will have antenna ports (7, 8, 9, 10). Rank-8 pattern will have antenna ports (11, 12, 13, 14, 15, 16, 17, 18).

In one embodiment of DRS pattern 401, G carries DRS (4, 5), H carries DRS (6,7), I carries DRS (8,9) and J carries DRS (10,11). In one embodiment of DRS pattern 403, K carries DRS (4, 5, 6, 7) and L carries DRS (8, 9, 10, 11).

Each of the demodulation reference signal (DM-RS) patterns in FIGS. 3A-3C and FIG. 4 is resource block (RB) based. Accordingly, a UE (or MS) may perform channel estimation and demodulation per resource block. Alternatively, if resource block bundling is supported, the UE (or MS) may perform channel estimation and demodulation jointly across bundled resource blocks. In this way, the performance of channel estimation and demodulation can be improved.

Resource block-bundling gain is achieved only when a base station (BS or eNodeB) performs the same downlink precoding vectors across the bundled resource blocks. Accordingly, a UE or MS may perform channel estimation and demodulation over the bundled resource blocks jointly.

In other words, resource block bundling reduces the precoding flexibility, since the precoding vectors within the bundled resource blocks have to be the same. This results in a trade-off between gains from increasing channel interpolation span in frequency versus losses from increasing frequency selective precoding granularity.

Therefore, there is a need for improved techniques for bundling resource blocks in a wireless communication system.

SUMMARY

To overcome the above-describe deficiencies in the prior art, a base station is provided for use in a wireless network operable to communicate with a plurality of mobile stations. The base station is operable to transmit a downlink frame to a first mobile station. The downlink frame comprises time-frequency resource elements allocated in a plurality of physical resource blocks. The base station transmits the plurality of physical resource blocks in bundles having a bundle size that is a function of the system bandwidth configuration. The base station uses the same precoder for all physical resource blocks in the same bundle.

In one embodiment, the bundle size is from one physical resource block to three physical resource blocks.

In another embodiment, the bundle size is equal to one physical resource block when the system bandwidth is less than a first threshold.

In another embodiment, the bundle size is equal to two physical resource blocks when the system bandwidth is greater than or equal to the first threshold, but less than a second threshold.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 8A, 8B and 8C illustrate TABLES 1-3, which provide examples of bundling sizes determined by downlink system bandwidth configuration.

DETAILED DESCRIPTION

FIGS. 1 through 8, discussed below, and the various embodiments used to describe the principles of the disclosure in this patent document are by way of illustration only and should not be construed in any way to limit the scope of the disclosure. Those skilled in the art will understand that the principles of the present disclosure may be implemented in any suitably arranged wireless communication system.

Figure 1:
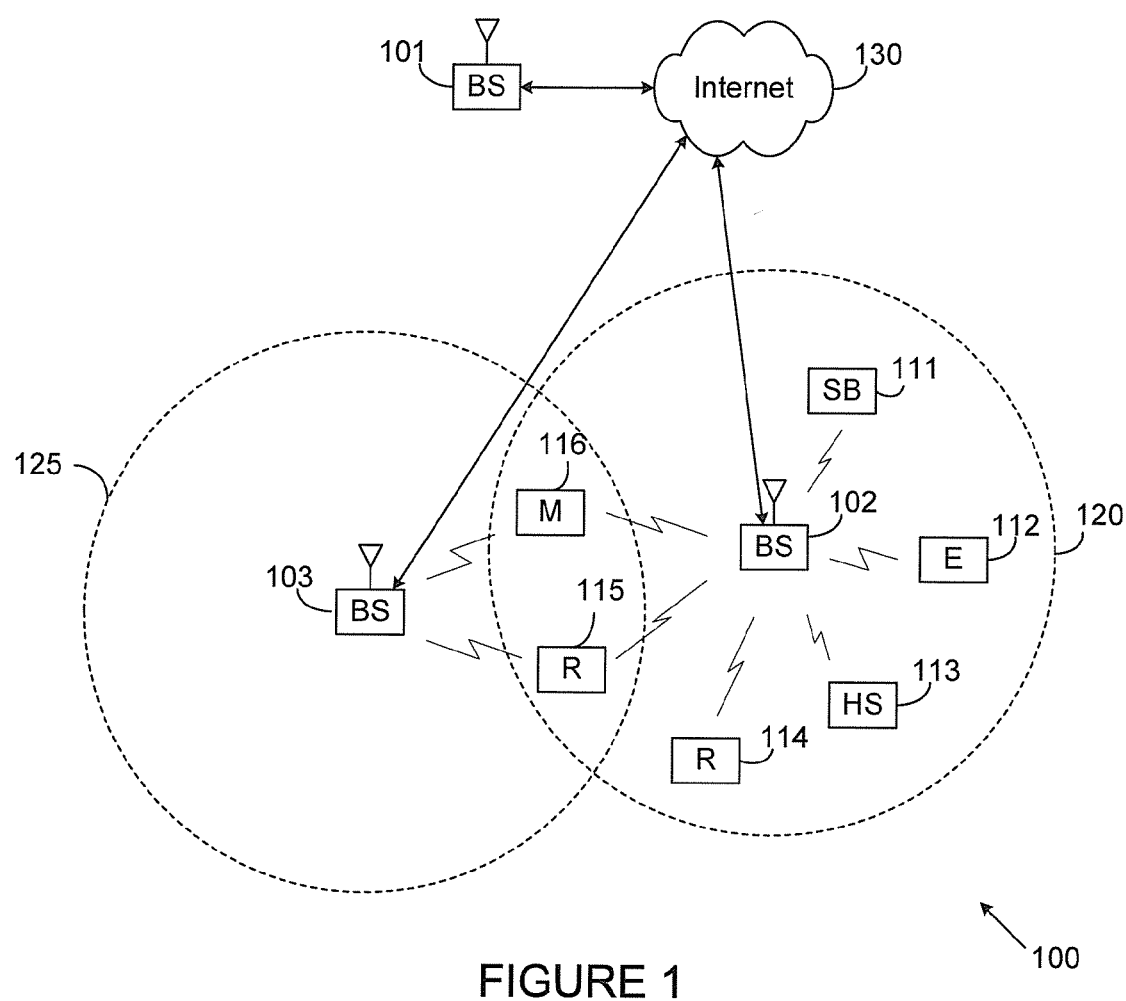
FIG. 1 illustrates an exemplary wireless network that transmits messages in the uplink according to the principles of the disclosure.

FIG. 1 illustrates exemplary wireless network 100, which transmits messages according to the principles of the present disclosure. In the illustrated embodiment, wireless network 100 includes base station (BS) 101, base station (BS) 102, base station (BS) 103, and other similar base stations (not shown). Base station 101 is in communication with Internet 130 or a similar IP-based network (not shown).

Depending on the network type, other well-known terms may be used instead of "base station," such as "eNodeB" or "access point". For the sake of convenience, the term "base station" shall be used herein to refer to the network infrastructure components that provide wireless access to remote terminals.

Base station 102 provides wireless broadband access to Internet 130 to a first plurality of mobile stations within coverage area 120 of base station 102. The first plurality of subscriber stations includes mobile station 111, which may be located in a small business (SB), mobile station 112, which may be located in an enterprise (E), mobile station 113, which may be located in a WiFi hotspot (HS), mobile station 114, which may be located in a first residence (R), mobile station 115, which may be located in a second residence (R), and mobile station 116, which may be a mobile device (M), such as a cell phone, a wireless laptop, a wireless PDA, or the like.

For sake of convenience, the term "mobile station" is used herein to designate any remote wireless equipment that wirelessly accesses a base station, whether or not the mobile station is a truly mobile device (e.g., cell phone) or is normally considered a stationary device (e.g., desktop personal computer, vending machine, etc.). In other systems, other well-known terms may be used instead of "mobile station", such as "subscriber station (SS)", "remote terminal (RT)", "wireless terminal (WT)", "user equipment (UE)", and the like.

Base station 103 provides wireless broadband access to Internet 130 to a second plurality of mobile stations within coverage area 125 of base station 103. The second plurality of mobile stations includes mobile station 115 and mobile station 116. In an exemplary embodiment, base stations 101-103 may communicate with each other and with mobile stations 111-116 using OFDM or OFDMA techniques.

While only six mobile stations are depicted in FIG. 1, it is understood that wireless network 100 may provide wireless broadband access to additional mobile stations. It is noted that mobile station 115 and mobile station 116 are located on the edges of both coverage area 120 and coverage area 125. Mobile station 115 and mobile station 116 each communicate with both base station 102 and base station 103 and may be said to be operating in handoff mode, as known to those of skill in the art.

Figure 2A:
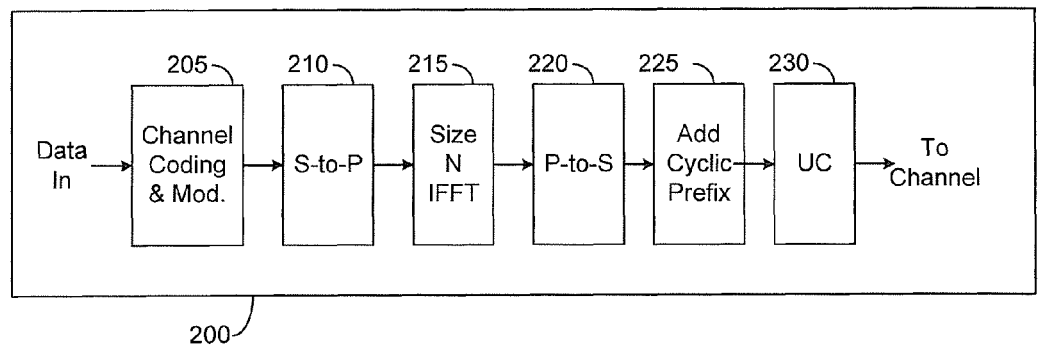
FIG. 2A is a high-level diagram of an orthogonal frequency division multiple access (OFDMA) transmitter according to one embodiment of the disclosure.
Figure 2B:
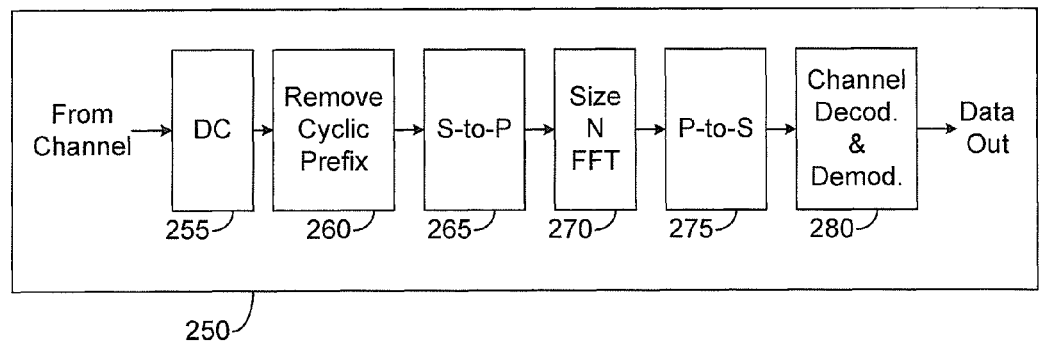
FIG. 2B is a high-level diagram of an OFDMA receiver according to one embodiment of the disclosure.
Figure 3A:
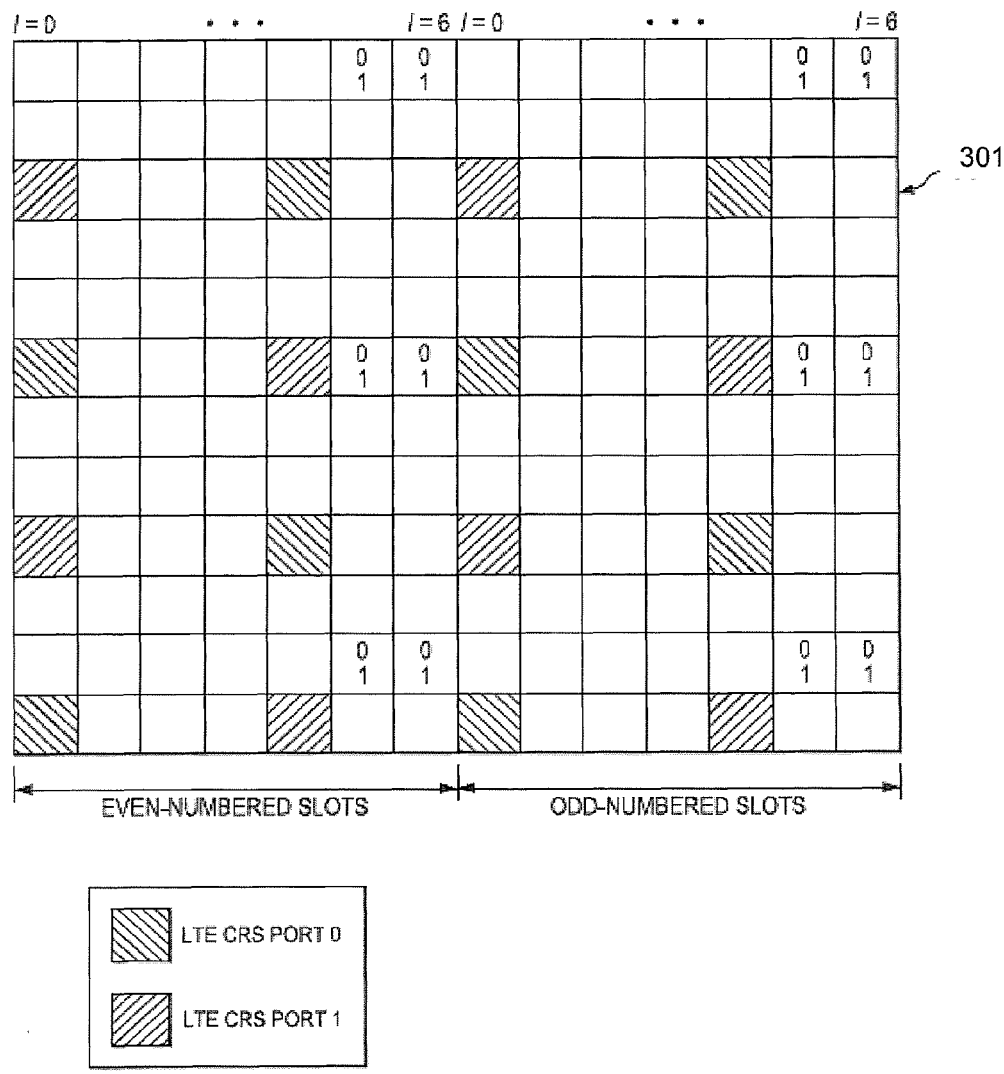
FIGS. 3A-3C illustrate dedicated reference signal (DRS) patterns that support two and four layer transmissions according to an embodiment of the disclosure.
Figure 3B:
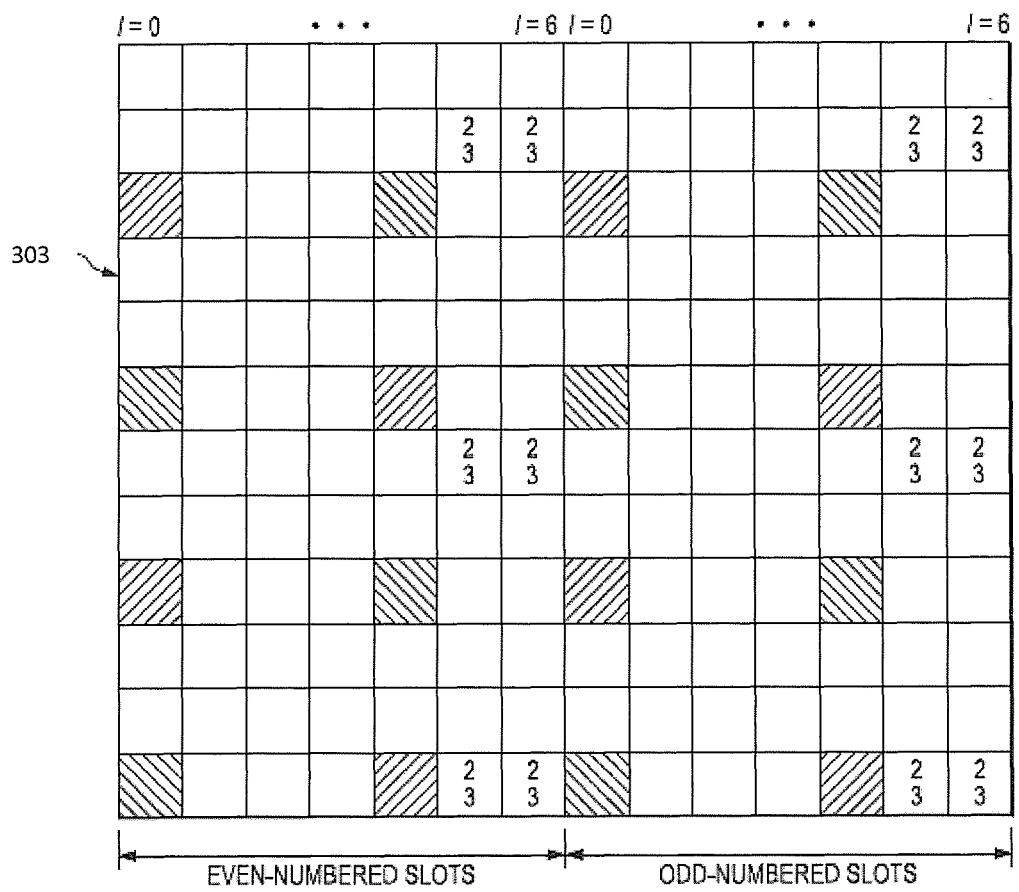
Figure 3C:
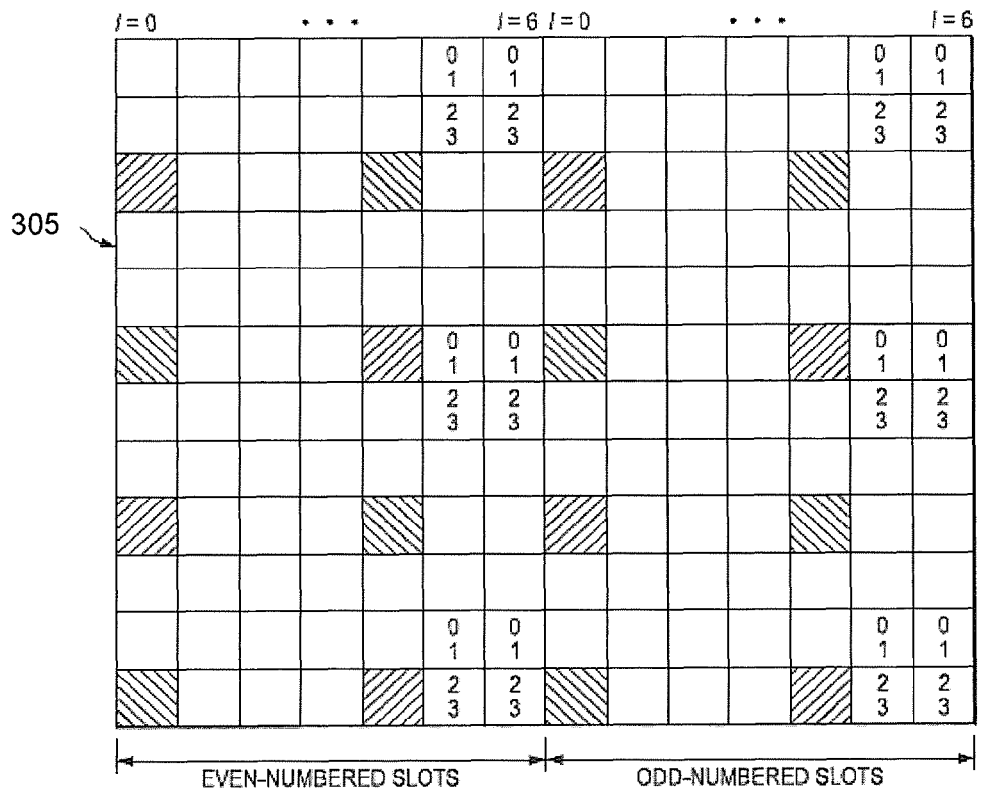
Figure 4:
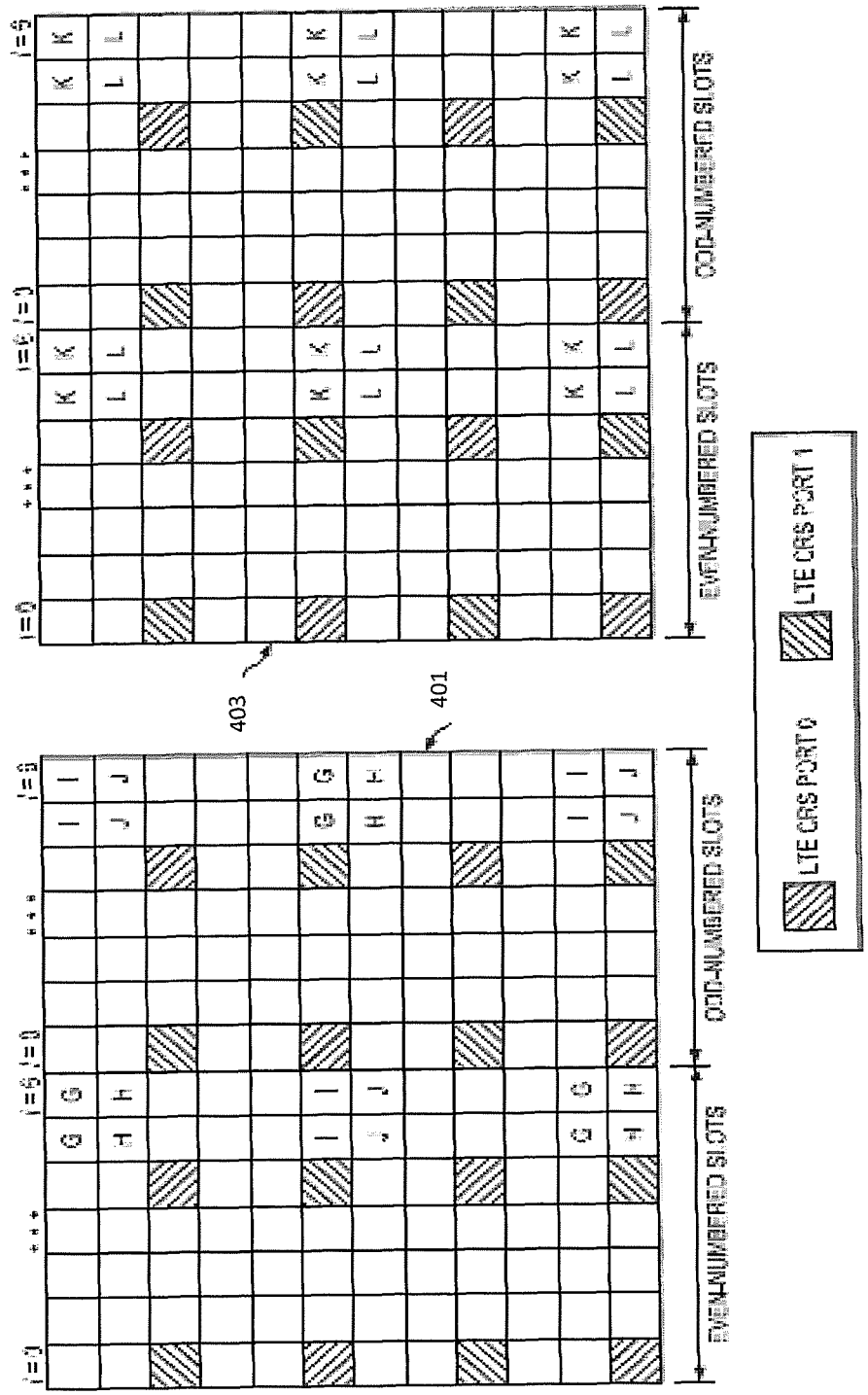
FIG. 4 illustrates DRS patterns that support eight layer transmissions according to an embodiment of the disclosure.

FIG. 2A is a high-level diagram of an orthogonal frequency division multiple access (OFDMA) transmit path 200. FIG. 2B is a high-level diagram of an orthogonal frequency division multiple access (OFDMA) receive path 250. In FIGS. 2A and 2B, the OFDMA transmit path 200 is implemented in base station (BS) 102 and the OFDMA receive path 250 is implemented in mobile station (MS) 116 for the purposes of illustration and explanation only. However, it will be understood by those skilled in the art that the OFDMA receive path 250 may also be implemented in BS 102 and the OFDMA transmit path 200 may be implemented in MS 116.

The transmit path 200 in BS 102 comprises a channel coding and modulation block 205, a serial-to-parallel (S-to-P) block 210, a Size N Inverse Fast Fourier Transform (IFFT) block 215, a parallel-to-serial (P-to-S) block 220, an add cyclic prefix block 225, and an up-converter (UC) 230.

The receive path 250 in MS 116 comprises a down-converter (DC) 255, a remove cyclic prefix block 260, a serial-to-parallel (S-to-P) block 265, a Size N Fast Fourier Transform (FFT) block 270, a parallel-to-serial (P-to-S) block 275, and a channel decoding and demodulation block 280.

At least some of the components in FIGS. 2A and 2B may be implemented in software while other components may be implemented by configurable hardware or a mixture of software and configurable hardware. In particular, it is noted that the FFT blocks and the IFFT blocks described in the present disclosure document may be implemented as configurable software algorithms, where the value of Size N may be modified according to the implementation.

Channel coding and modulation block 205 receives a set of information bits, applies coding (e.g., Turbo coding) and modulates (e.g., QPSK, QAM) the input bits to produce a sequence of frequency-domain modulation symbols. Serial-to-parallel block 210 converts (i.e., de-multiplexes) the serial modulated symbols to parallel data to produce N parallel symbol streams where N is the IFFT/FFT size used in BS 102 and MS 116. Size N IFFT block 215 then performs an IFFT operation on the N parallel symbol streams to produce time-domain output signals. Parallel-to-serial block 220 converts (i.e., multiplexes) the parallel time-domain output symbols from Size N IFFT block 215 to produce a serial time-domain signal. Add cyclic prefix block 225 then inserts a cyclic prefix to the time-domain signal. Finally, up-converter 230 modulates (i.e., up-converts) the output of add cyclic prefix block 225 to RF frequency for transmission via a wireless channel. The signal may also be filtered at baseband before conversion to RF frequency.

The transmitted RF signal arrives at MS 116 after passing through the wireless channel and reverse operations performed at BS 102. Down-converter 255 down-converts the received signal to baseband frequency and remove cyclic prefix block 260 removes the cyclic prefix to produce the serial time-domain baseband signal. Serial-to-parallel block 265 converts the time-domain baseband signal to parallel time domain signals. Size N FFT block 270 then performs an FFT algorithm to produce N parallel frequency-domain signals. Parallel-to-serial block 275 converts the parallel frequency-domain signals to a sequence of modulated data symbols. Channel decoding and demodulation block 280 demodulates and then decodes the modulated symbols to recover the original input data stream.

Each of base stations 101-103 may implement a transmit path that is analogous to transmitting in the downlink to mobile stations 111-116 and may implement a receive path that is analogous to receiving in the uplink from mobile stations 111-116. Similarly, each one of mobile stations 111-116 may implement a transmit path corresponding to the architecture for transmitting in the uplink to base stations 101-103 and may implement a receive path corresponding to the architecture for receiving in the downlink from base stations 101-103.

U.S. patent application Ser. No. 12/970,717, filed Dec. 16, 2010 and entitled "METHOD AND SYSTEM FOR ENABLING RESOURCE BLOCK BUNDLING IN LTE-A SYSTEMS", disclosed unique and novel techniques for enabling and disabling resource block bundling. U.S. patent application Ser. No. 12/970,717 was incorporated by reference above.

In an advantageous embodiment of the present disclosure, physical resource block (PRB) bundling is enabled when the system is configured in FDD operation mode and disabled when the system is configured in TDD operation mode. Enabling PRB bundling means that the mobile station (or UE) may assume that a set of consecutive physical resource blocks use the same precoder for the corresponding physical downlink shared channel (PDSCH) from the serving base station (BS) to the mobile station. Disabling PRB bundling means that the mobile station (or UE) may only assume that the precoder stays the same within one physical resource block (PRB).

The awareness of the mobile station (MS) of FDD operation mode and TDD operation mode may be realized through downlink frame structure. That is, when the mobile station is configured in frame structure type 1, then the mobile station operates in FDD mode and PRB bundling is enabled (or turned on). Alternatively, when the mobile station is configured in frame structure type 2, the mobile station operates in the TDD mode and PRB bundling is disabled (or turned off).

In an advantageous embodiment of the present disclosure, the total system bandwidth is partitioned into disjoint precoding subsets, where the precoding subset consists of M consecutive physical resource blocks (PRBs). In this case, a precoding subset i is composed of PRBs with PRB numbers:

$$n_{PRB} = M \times i, \ldots, \min(M \times (i+1) - 1, N_{RB}^{DL}),$$

where $$i = 0, \ldots, \left\lfloor \frac{N_{RB}^{DL}}{M} \right\rfloor.$$

The value $N_{RB}^{DL}$ is the total number of resource blocks within a downlink system bandwidth (also known as a downlink system bandwidth configuration in LTE). When a mobile station is scheduled in N PRBs, the mobile station may assume the same precoder is applied to all PRBs within a precoding subset.

In one embodiment of the present disclosure, the size of the precoding subset (bundling size) is the same for all downlink system bandwidth configurations defined in LTE.

A wireless network according to the principles of the present disclosure implements a bundling size that accounts for the tradeoff between the quality of channel estimation and the flexibility of precoders used in a physical resource block. As is known, a base station must use the same precoder for all allocated PRBs in the same bundle. If the bundling size is too big, flexibility in precoding is reduced since all PRBs in the same bundle use the same precoders. However, if bundling size is too small, then channel estimation suffers. A mobile station (or UE) obtains better channel estimation for a particular precoder if the mobile station performs channel estimation across a greater number of physical resource blocks for a particular precoder. In an advantageous embodiment of the present disclosure, a bundle size from one (1) to three (3) PRBs provides the necessary tradeoff between precoding flexibility and channel estimation.

In an advantageous embodiment of the present disclosure, the bundling size is determined by, or is a function of, a downlink system bandwidth configuration. As the system bandwidth increases, the bundling size also increases. In a preferred embodiment, the bundling size is also determined by the resource block group (RBG) size (i.e., the size of virtual resource blocks). FIGS. 8A, 8B and 8B illustrate TABLES 1-3, respectively, which provide examples of bundling sizes determined by downlink system bandwidth configuration and RBG size. In TABLE 1, a system bandwidth that is below a first threshold equal to eleven (11) physical resource blocks (PRBs) uses a bundling size of M=1 PRB. A system bandwidth that is greater than or equal to the first threshold, but less than a second threshold (i.e., from 11 to 63 PRBs) uses a bundling size of M=2 PRBs. A system bandwidth that is greater than the third threshold (i.e., from 64 to 110 or more) of physical resource blocks uses a bundling size of M=3 PRBs.

In an alternate embodiment shown in TABLE 2, a system bandwidth less than the first threshold (i.e., 10 or less PRBs) uses a bundling size of M=1 PRB, whereas a system bandwidth greater than the first threshold (i.e., 11 or more) uses a bundling size of M=2 PRBs.

In another embodiment shown in TABLE 3, the bundling size is determined as a function of downlink system bandwidth configuration, including resource block group (RBG) size=P). A system bandwidth below a first threshold (10 or less PRBs) and RBG size, P=1, uses a bundling size of M=1 PRB. A system bandwidth greater than or equal to the first threshold, but less than a second threshold (i.e., 11 to 26 PRBs) and RBG size, P=2, uses a bundling size of M=2 PRBs. A system bandwidth greater than or equal to the first threshold, but less than a second threshold (i.e., 27 to 63 PRBs) and RBG size, P=3, uses a bundling size of M=3 PRBs.

Finally, a system bandwidth greater than the fourth threshold (i.e., 64 or more PRBs) and RBG size, P=4, uses a bundling size of M=2 PRBs. In this last example, even though the system bandwidth and RBG size are increased, the bundling size is reduced to 2. This is to ensure that the bundling size (2) is evenly divisible into the RBG size (4). If a bundling size of 4 PRBs had been used, too much precoder flexibility would be lost, since the same precoder would have to be used in all 4 PRBs. However, an RGB size of 4 PRBs would not be evenly divided by a bundling size of 3 PRBs. As a result, one bundle of 3 PRBs would use one precoder and another bundle of only 1 PRB would use another precoder, which would cause channel estimation to suffer.

Figure 5:
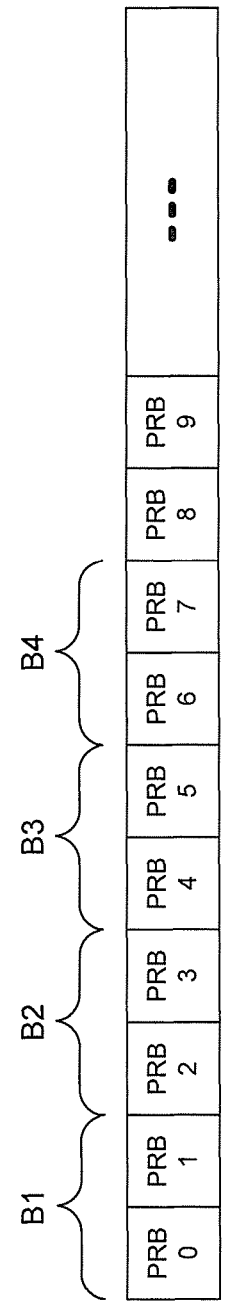
FIG. 5 illustrates a bundling size of M=2 according to an embodiment of the disclosure.

A bundling size of M=2 means that every pair of physical resource blocks is bundled, irrespective of the total system bandwidth. FIG. 5 illustrates a bundling size of M=2. In FIG. 5, different pairs of physical resource blocks are bundled together in bundle B1, bundle B2, bundle B3, etc. For example, physical resource blocks PRB0 and PRB1 are in bundle B1, physical resource blocks PRB2 and PRB3 are in bundle B2, and so forth. The mobile station may assume, by default setting, that the PRBs in the same bundle use the same precoders. By way of example, the mobile station assumes that PRB0 and PRB1 use the same precoders (i.e., same precoding subset), since PRB0 and PRB1 are in the same bundle. The PRBs in different bundles may use different precoders.

Let M be the fixed bundling size of the PRB bundling. Then the total number of precoding subsets in the downlink ($N_{PB}^{DL}$) is:

$$N_{PB}^{DL} = \left\lceil \frac{N_{RB}^{DL}}{M} \right\rceil,$$

where $N_{RB}^{DL}$ is the downlink bandwidth configuration.

Accordingly, the precoding subset of i, where $$i = 0, \ldots, \left\lfloor \frac{N_{RB}^{DL}}{M} \right\rfloor,$$

consists of PRBs where the PRB number ($n_{PRB}$) in the frequency domain is:

$$M \times i, \ldots, M \times (i+1) - 1.$$

Accordingly, upon reception of the downlink resource allocation, a mobile station performs channel estimation and demodulation based on the value $n_{PRB}$, the value M, the resource allocation type, and the virtual resource block type.

For example, for resource allocation type 0 and 2 under localized virtual resource blocks, the mobile station may assume the same precoder for the downlink assigned PRBs which fall into the same precoding subset, as described for FIG. 5.

Figure 6:
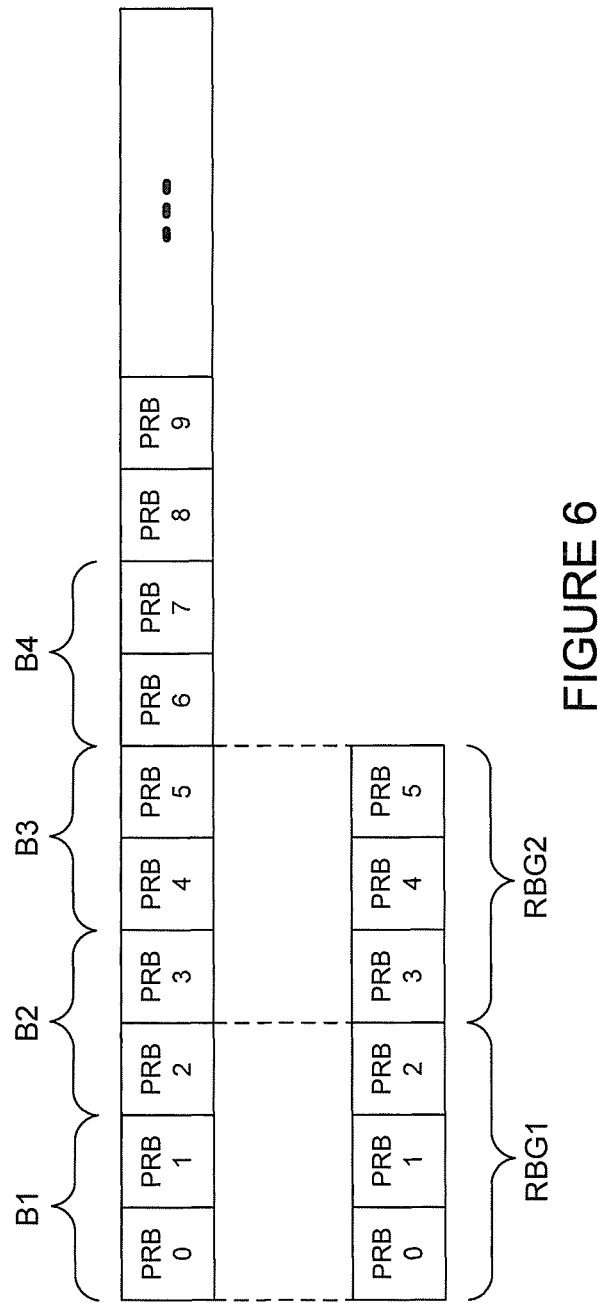
FIG. 6 illustrates bundling of physical resource blocks for a particular resource allocation and virtual resource blocks of localized type according to an embodiment of the disclosure.

FIG. 6 illustrates bundling of physical resource blocks for a particular resource allocation and virtual resource blocks of localized type according to an embodiment of the disclosure. In FIG. 6, the mobile station is configured to receive Type 0 resource allocation under localized virtual resource allocation type. More specifically, the mobile station receives resource allocation of resource block groups RBG1 and RBG2, which consist of physical resource blocks PRB0, PRB1, PRB2, PRB3, PRB4 and PRB5. For the case where M=2, the mobile station may assume that PRB0 and PRB1 have the same precoder because RPB0 and PRB1 are both in bundle B1. The mobile station may also assume that PRB2 and PRB3 have the same precoder because RPB2 and PRB2 are both in bundle B2. Finally, the mobile station may assume that PRB4 and PRB5 have the same precoder because RPB4 and PRB5 are both in bundle B3.

Figure 7:
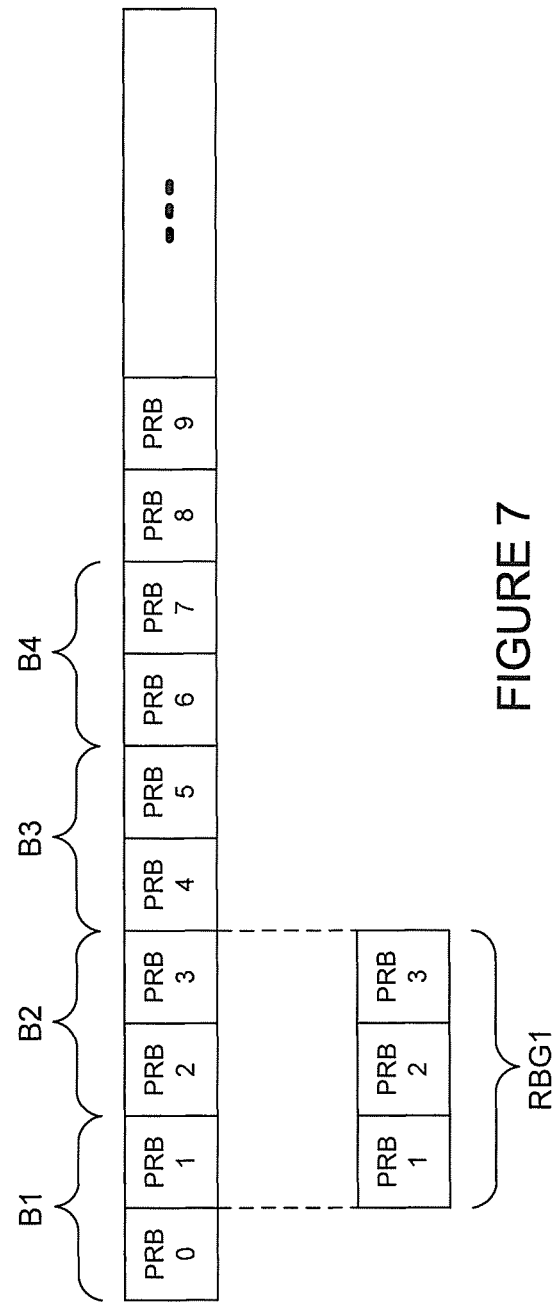
FIG. 7 illustrates bundling of physical resource blocks for a particular resource allocation and virtual resource blocks of localized type according to another embodiment of the disclosure.

FIG. 7 illustrates bundling of physical resource blocks for a particular resource allocation and virtual resource blocks of localized type according to another embodiment of the disclosure. In FIG. 7, the mobile station is configured to receive Type 2 compact resource allocation under localized virtual resource type. More specifically, the mobile station is configured to receive physical resource blocks PRB1, PRB2 and PRB3 for the physical downlink shared channel (PDSCH). For the case where M=2, as shown in FIG. 7, the mobile station may assume that PRB2 and PRB3 have the same precoder since PRB1 and PRB2 are in the same precoding subset (i.e., same bundle B2). However, for PRB1, the mobile station may assume PRB1 uses a different precoder for channel estimation purposes, since PRB1 is in bundle B1.

For the case of virtual resource blocks of distributed type, the mobile station may assume that PRB bundling is off and would assume that each PRB will have a different precoder.

For the case of Type 1 resource allocation, the same approach shown in the previous examples may apply, so that the mobile station may assume the same precoder for the PRBs that fall in the same precoding subset.

Although the present disclosure has been described with an exemplary embodiment, various changes and modifications may be suggested to one skilled in the art. It is intended that the present disclosure encompass such changes and modifications as fall within the scope of the appended claims.

The invention claimed is:

1. A method for communication, the method comprising:
   allocating resources based on a resource block group for resource allocation; and
   applying a same precoder to all physical resource blocks within a resource block group for resource block bundling,
   wherein a number of resource blocks within the resource block group for resource block bundling and a number of resource blocks within a resource block group for resource allocation is 1 if a system bandwidth is less than or equal to 10 resource blocks,
   wherein the number of resource blocks within the resource block group for resource block bundling and the number of resource blocks within the resource block group for resource allocation is 2 if the system bandwidth is between 11 and 26 resource blocks,
   wherein the number of resource blocks within the resource block group for resource block bundling and the number of resource blocks within the resource block group for resource allocation is 3 if the system bandwidth is between 27 and 63 resource blocks,
   wherein the number of resource blocks within the resource block group for resource block bundling is 2 and the number of resource blocks within the resource block group for resource allocation is 4 if the system bandwidth is between 64 and 110 resource blocks, and
   transmitting data to a mobile station using resource blocks within the resource block group for resource block bundling.

2. The method of claim 1, wherein if the number of resource blocks within the resource block group for resource block bundling is M, a total number of resource block groups for resource block bundling ($N_{PB}^{DL}$) is defined based on $$N_{PB}^{DL} = \left\lceil \frac{N_{RB}^{DL}}{M} \right\rceil,$$

where $N_{RB}^{DL}$ is the system bandwidth.

3. The method of claim 1, wherein a last resource block within a last resource block group for resource block bundling is determined based on $N_{RB}^{DL}$, where $N_{RB}^{DL}$ is the system bandwidth.

4. The method of claim 1, wherein resource block bundling is available if a transmission mode supporting up to 8 antenna ports is configured.

5. The method of claim 1, wherein resource allocation is based on virtual resource blocks of a distributed type or virtual resource blocks of a localized type.

6. A base station, comprising:
   a transmit path circuitry configured to:
      allocate resources based on a resource block group for resource allocation; and
      apply a same precoder to all resource blocks within a resource block group for resource block bundling, wherein a number of resource blocks within the resource block group for resource block bundling and a number of resource blocks within a resource block group for resource allocation is 1 if a system bandwidth is less than or equal to 10 resource blocks, wherein the number of resource blocks within the resource block group for resource block bundling and the number of resource blocks within the resource block group for resource allocation is 2 if the system bandwidth is between 11 and 26 resource blocks, wherein the number of resource blocks within the resource block group for resource block bundling and the number of resource blocks within the resource block group for resource allocation is 3 if the system bandwidth is between 27 and 63 resource blocks, wherein the number of resource blocks within the resource block group is 2 and the number of resource blocks within the resource block group for resource allocation is 4 if the system bandwidth is between 64 and 110 resource blocks, and transmit data to a mobile station using resource blocks within the resource block group for resource block bundling.

7. The base station of claim 6, wherein if the number of resource blocks within the resource block group for resource block bundling is M, a total number of resource block groups for resource block bundling ($N_{PB}^{DL}$) is defined based on $$N_{PB}^{DL} = \left\lceil \frac{N_{RB}^{DL}}{M} \right\rceil,$$

where $N_{RB}^{DL}$ is the system bandwidth.

8. The base station of claim 6, wherein a last resource block within a last resource block group for resource block bundling is determined based on $N_{RB}^{DL}$, where $N_{RB}^{DL}$ is the system bandwidth.

9. The base station of claim 6, wherein application of the same precoder by the transmit path circuitry to all resource blocks within the resource block group for resource block bundling is available if a transmission mode supporting up to 8 antenna ports is configured.

10. The base station of claim 6, wherein the transmit path circuitry allocates resources based on virtual resource blocks of a distributed type or virtual resource blocks of a localized type.

11. A method for communication, the method comprising:
receiving resource allocation based on a resource block group for resource allocation,
wherein a same precoder is applied to all resource blocks within a resource block group for resource block bundling,
wherein a number of resource blocks within the resource block group for resource block bundling and a number of resource blocks within a resource block group for resource allocation is 1 if a system bandwidth is less than or equal to 10 resource blocks,
wherein the number of resource blocks within the resource block group for resource block bundling and the number of resource blocks within the resource block group for resource allocation is 2 if the system bandwidth is between 11 and 26 resource blocks,
wherein the number of resource blocks within the resource block group for resource block bundling and the number of resource blocks within the resource block group for resource allocation is 3 if the system bandwidth is between 27 and 63 resource blocks,
wherein the number of resource blocks within the resource block group is 2 and the number of resource blocks within the resource block group for resource allocation is 4 if the system bandwidth is between 64 and 110 resource blocks; and
receiving data from a base station using resource blocks within the resource block group for resource block bundling.

12. The method of claim 11, wherein if the number of resource blocks within the resource block group for resource block bundling is M, a total number of resource block groups for resource block bundling ($N_{PB}^{DL}$) is defined based on $$N_{PB}^{DL} = \left\lceil \frac{N_{RB}^{DL}}{M} \right\rceil,$$

where $N_{RB}^{DL}$ is the system bandwidth.

13. The method of claim 11, wherein a last resource block within a last resource block group for resource block bundling is determined based on $N_{RB}^{DL}$, where $N_{RB}^{DL}$ is the system bandwidth.

14. The method of claim 11, wherein the same precoder is assumed to be applied to all resource blocks within a resource block group for resource block bundling if a transmission mode supporting up to 8 antenna ports is configured.

15. The method of claim 11, wherein the received resource allocation based on the resource block group for resource allocation is based on virtual resource blocks of a distributed type or virtual resource blocks of a localized type.

16. A mobile station, comprising:
a receive path circuitry configured to:
receive resource allocation based on a resource block group for resource allocation,
wherein a same precoder is applied to all resource block within a resource block group for resource block bundling,
wherein a number of resource blocks within the resource block group for resource block bundling and a number of resource blocks within a resource block group for resource allocation is 1 if a system bandwidth is less than or equal to 10 resource blocks,
wherein the number of resource blocks within the resource block group for resource block bundling and the number of resource blocks within the resource block group for resource allocation is 2 if the system bandwidth is between 11 and 26 resource blocks,
wherein the number of resource blocks within the resource block group for resource block bundling and the number of resource blocks within the resource block group for resource allocation is 3 if the system bandwidth is between 27 and 63 resource blocks,
wherein the number of resource blocks within the resource block group is 2 and the number of resource blocks within the resource block group for resource allocation is 4 if the system bandwidth is between 64 and 110 resource blocks; and
receive data from a base station using resource blocks within the resource block group for resource block bundling.

17. The mobile station of claim 16, wherein if the number of resource blocks within the resource block group for resource block bundling is M, a total number of resource block groups for resource block bundling ($N_{PB}^{DL}$) is defined based on $$N_{PB}^{DL} = \left\lceil \frac{N_{RB}^{DL}}{M} \right\rceil,$$

where $N_{RB}^{DL}$ is the system bandwidth.

18. The mobile station of claim 16, wherein a last resource block within a last resource block group for resource block bundling is determined based on $N_{RB}^{DL}$, where $N_{RB}^{DL}$ is the system bandwidth.

19. The mobile station of claim 16, wherein the receive path circuitry assumes a same precoder is applied to all resource blocks within a resource block group for resource block bundling if a transmission mode supporting up to 8 antenna ports is configured.

20. The mobile station of claim 16, wherein the receive path circuitry is configured to receive resource allocation based on virtual resource blocks of a distributed type or virtual resource blocks of a localized type.

* * * * *

UNITED STATES PATENT AND TRADEMARK OFFICE
CERTIFICATE OF CORRECTION

PATENT NO. : 9,295,051 B2
APPLICATION NO. : 14/555267
DATED : March 22, 2016
INVENTOR(S) : Lingjia Liu et al.

It is certified that error appears in the above-identified patent and that said Letters Patent is hereby corrected as shown below:

In the Claims

Column 10, Line 18 should read - wherein each of a number of resource blocks within the resource Column 10, Line 23 should read - wherein each of the number of resource blocks within the resource Column 10, Line 28 should read - wherein each of the number of resource blocks within the resource Column 11, Line 1 should read - wherein each of a number of resource blocks within the resource Column 11, Line 6 should read - wherein each of the number of resource blocks within the Column 11, Line 11 should read - wherein each of the number of resource blocks within the Column 11, Line 55 should read - wherein each of a number of resource blocks within the resource Column 11, Line 60 should read - wherein each of the number of resource blocks within the resource Column 11, Line 65 should read - wherein each of the number of resource blocks within the resource Column 12, Line 43 should read - wherein each of a number of resource blocks within the resource Column 12, Line 48 should read - wherein each of the number of resource blocks within the Column 12, Line 53 should read - wherein each of the number of resource blocks within the Signed and Sealed this
Seventh Day of June, 2016

Michelle K. Lee
*Director of the United States Patent and Trademark Office*